United States Patent

Ma et al.

[11] Patent Number: 6,019,154
[45] Date of Patent: Feb. 1, 2000

[54] SELF LEVELING OPERATION STAGE FOR ULTRASONIC WELDING

[75] Inventors: Scott T. Ma; Xinpei Lu, both of Lawrenceville, Ga.; Mark S. Bresin, Plantation, Fla.

[73] Assignee: Motorola, Inc., Schammburg, Ill.

[21] Appl. No.: 09/110,421

[22] Filed: Jul. 6, 1998

Related U.S. Application Data

[63] Continuation of application No. 08/717,049, Sep. 20, 1996, abandoned.

[51] Int. Cl.[7] ................................................. B29C 65/08
[52] U.S. Cl. ...................... 156/580; 156/580.1; 156/581; 156/73.1; 248/582; 248/618; 248/623; 248/188.3; 108/2; 108/136; 100/258 R
[58] Field of Search ................. 156/73.1, 580.1, 156/580.2, 581, 580; 248/582, 603, 618, 623, 180.1, 181.1, 181.2, 188.2, 188.3; 108/2, 136; 100/46, 43, 258 R, 258 A, 265; 384/206

[56] References Cited

U.S. PATENT DOCUMENTS

| | | |
|---|---|---|
| 929,272 | 7/1909 | Baron . |
| 2,132,291 | 10/1938 | Fitus . |
| 3,116,539 | 1/1964 | Evans et al. .......................... 384/206 |
| 3,448,911 | 6/1969 | Cushman . |
| 3,475,814 | 11/1969 | Santangini . |
| 3,547,393 | 12/1970 | Gordin . |
| 3,574,923 | 4/1971 | Cushman . |
| 3,661,661 | 5/1972 | Berleyoung . |
| 3,752,382 | 8/1973 | Furnival . |
| 3,774,834 | 11/1973 | Holler et al. . |
| 3,947,307 | 3/1976 | Burhscheidt . |
| 4,431,474 | 2/1984 | Gronek et al. . |
| 4,875,614 | 10/1989 | Cipolla et al. . |
| 4,877,478 | 10/1989 | Cappi . |
| 4,896,811 | 1/1990 | Dunn et al. . |
| 4,934,671 | 6/1990 | Laninga et al. . |
| 5,127,573 | 7/1992 | Chang et al. . |
| 5,614,118 | 3/1997 | Weber . |

OTHER PUBLICATIONS

Herrmann Ultrasonics Product Brochure.

Primary Examiner—Michael W. Ball
Assistant Examiner—Michael A Tolin
Attorney, Agent, or Firm—Felipe J. Farley

[57] ABSTRACT

A manufacturing process, such as that used for ultrasonic welding, employs a self-leveling fixture (20) including a base (12) and an operation stage (14) that are separated by leveling devices (16) and 18). The leveling devices include a centrally located spherical plane bearing (16) and one or more spring members (18) disposed about the periphery of the operation stage. In this way, the operation stage can react in response to pressure applied thereto complying to the applied pressure, thus providing a realistic self-leveling feature. After the pressure is removed, the return to a normal position via the spring action of spring (18).

12 Claims, 5 Drawing Sheets

SELF LEVELING OPERATION STAGE FOR ULTRASONIC WELDING

This application is a continuation-in-part of U.S. Ser. No. 08/717,049, docket no. EN 10491, filed Sep. 20, 1996, now abandoned, by inventors Scott T. Ma, Xinpei Lu, and Mark S. Bresin, entitled, "Self Leveling Manufacturing Fixture".

TECHNICAL FIELD

This invention relates in general to the field of fixtures for use in manufacturing processes, and more particularly to self-leveling fixtures adapted to hold piece parts during, for example, ultrasonic welding processes.

BACKGROUND OF THE INVENTION

In the high volume manufacture of many consumer products, the product housing, whether manufactured of plastic or metal, is formed of two or more parts. These parts, for example, the front and back of a radio housing, a cellular phone housing, a battery pack housing, or a floppy diskette, to name a few, have traditionally been joined together by processes such as gluing or ultrasonic welding. Gluing parts together by using an epoxy type glue has the disadvantage of being a relatively slow process as compared to the overall speed of current manufacturing processes. Moreover, the curing time for the epoxy is relatively long, during which period the front and back housings may not stay properly aligned. Accordingly, other processes such as ultrasonic or conventional welding of parts together has found an increasing acceptance in the marketplace. Ultrasonic welding is a process for using high speed vibration to melt localized areas, thus joining, for example, two pieces of plastic. Ultrasonic welding is not free from problems. In instances in which high volume products, e.g., on the order of 20 million units per year or more are being manufactured, housing parts such as those described above are typically ordered from at least two or more different suppliers. These suppliers manufacture the parts to a specification, and although manufactured to the same specifications, they have variations within tolerance limits that require adjustments to the setup of conventional ultrasonic welding devices. Typically, the time involved for setting up an ultrasonic welding station to accept a similar piece part from a different manufacturer can run on the order of 30–60 minutes, requiring substantial engineering effort to appropriately calibrate the device. Moreover, during the setup process, numerous piece parts are run on the device in order to check the quality of the device. Accordingly, hundreds and even thousands of piece parts may be scraped as a result of the set up process. The costs both in terms of time and scrap material are increasingly becoming unacceptable to most manufacturers.

Accordingly, there is a need for a self-leveling fixture for use in the manufacturing process such as an ultrasonic welding process. The self-leveling fixture should be provided so as to accommodate for subtle changes in the specification and tolerances of similar parts. This self-leveling fixture should allow for little or no variation in the presentation of the piece parts to be operated upon from the perspective of the operating device. Moreover, the self-leveling fixture should be easy to install and require little or no calibration.

DETAILED DESCRIPTION OF THE PREFERRED EMBODIMENT

Figure 1:
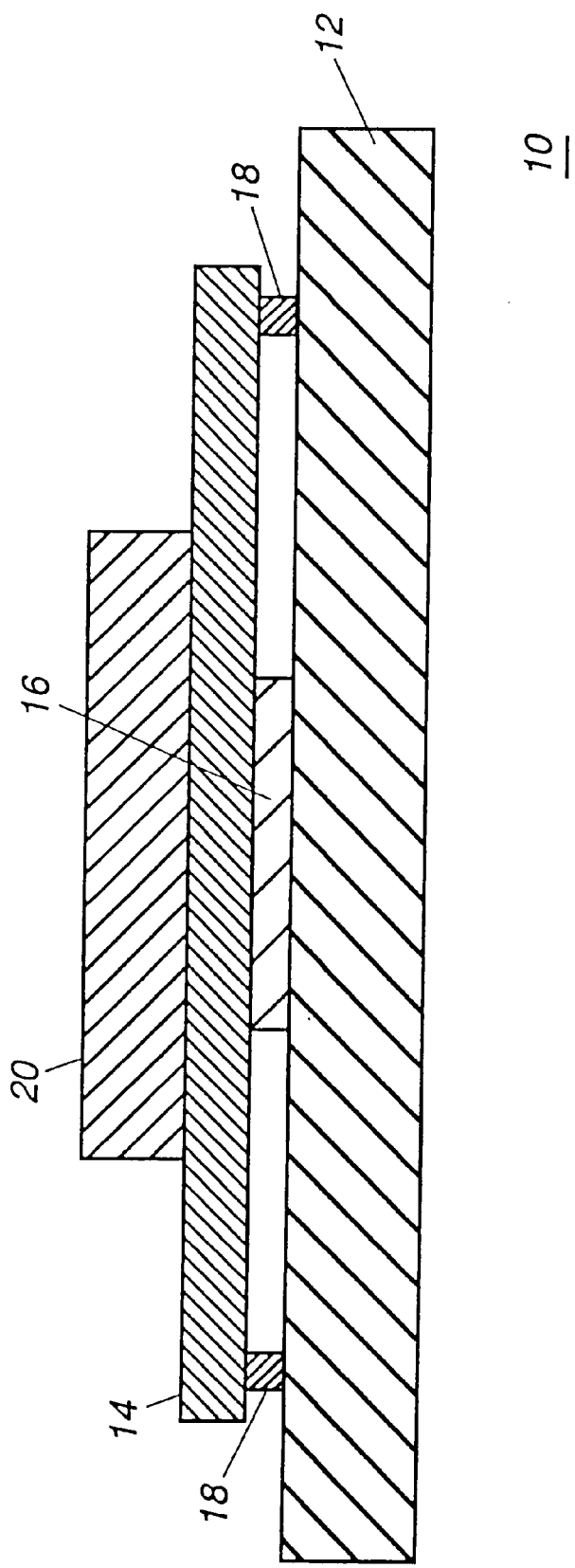
FIG. 1 is a side elevational view of a self-leveling fixture for a manufacturing process, in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is a side elevational view of a self-leveling fixture for a manufacturing process, in accordance with the instant invention. The self-leveling fixture 10 includes a base member 12 which can be mounted onto a manufacturing device such as an ultrasonic welding machine or which can be part of the ultrasonic welding device. The base member 12 should be fabricated of a heavy duty rugged material capable of withstanding application of pressure from the device into which it is incorporated. In this regard, the base 12 is typically fabricated of a durable metal, examples of which include, steel, iron, aluminum, fiberglass, and combinations thereof.

Spacedly disposed from base member 12 is an operation stage 14 upon which the manufacturing process desired will take place. More particularly, the operation stage is spacedly disposed from the base member 12 and separated therefrom by a self-correcting leveling means. The operation stage 14 is moveable in several directions, i.e., is able to flex, allowing it to react to pressure applied to it in a non-uniform manner. Hence, the stage adjusts, is self-leveled, and complies to the applied pressures to assure that a level plane is provided for each piece part. The self-correcting leveling means preferably includes one or more supporting means 16 and 18 adapted to allow the operation stage 14 to flex in response to pressure applied to a piece part positioned atop the operation stage 14. The self-correcting leveling means preferably includes, for example, a spherical planer bearing 16 disposed in a central region of the operation stage 14, and a plurality of spring members 18 disposed around a peripheral area of the operation stage 14.

Figure 4:
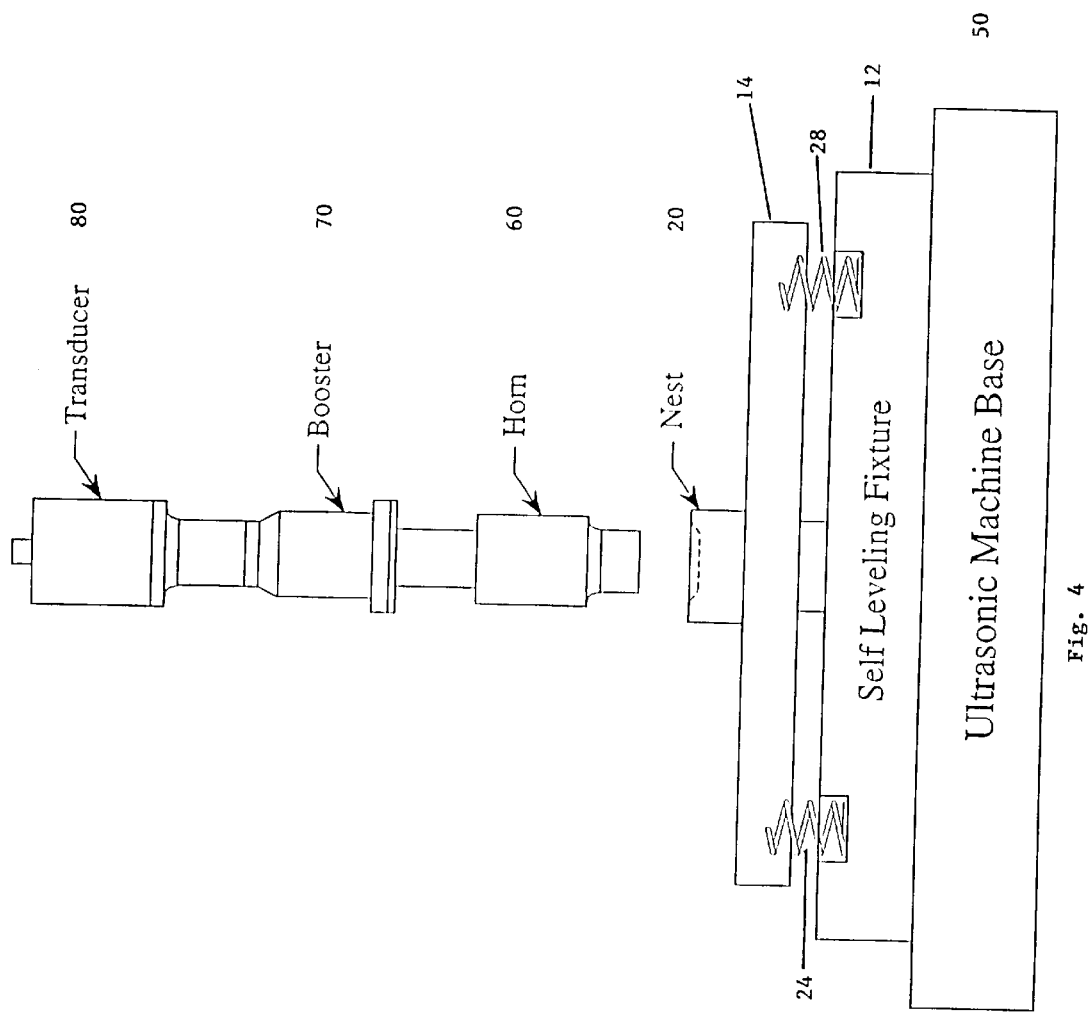
FIG. 4 is a side view of the self-leveling fixture of the present invention, placed atop an ultrasonic welder base.
Figure 5:
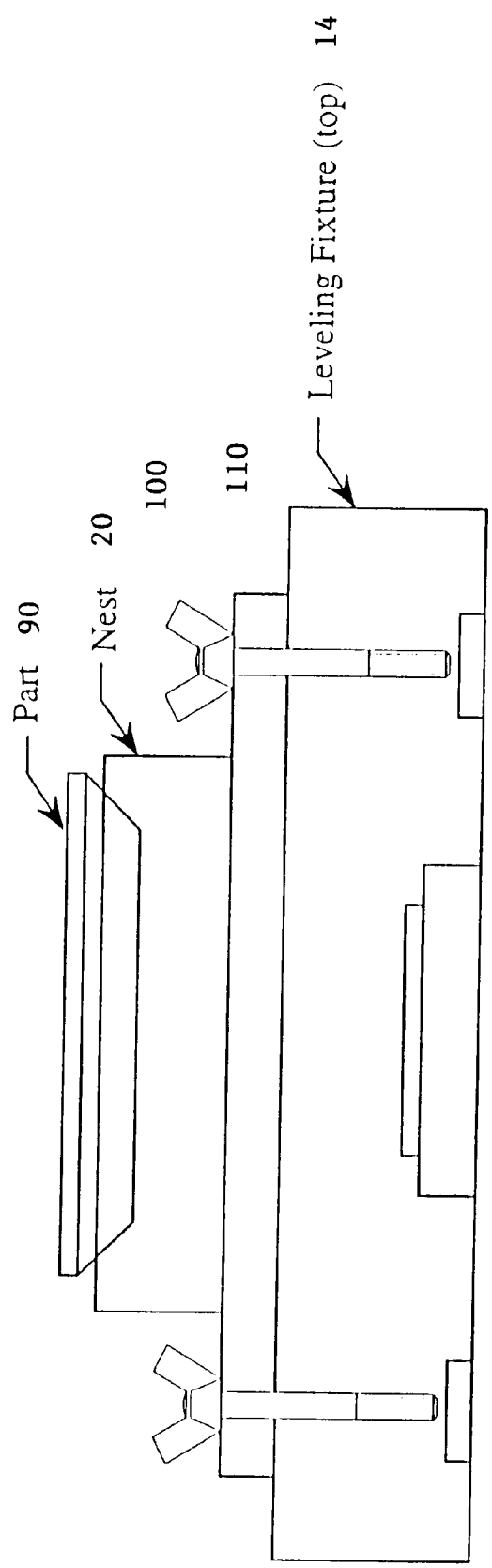
FIG. 5 is a close-up view of the top portion of the self-leveling fixture of the present invention, with a nest placed atop it, with a plastic part in the nest.

The operation stage 14 may further include a nesting member 20 [see FIGS. 4 and 5] disposed on the side thereof opposite the base member 12, said nesting member sized and shaped to accommodate a particular piece part to be operated on. In this regard, both the operation stage 14 and the nesting member 20 are made of rugged durable materials such as those described hereinabove with respect to base member 12.

Figure 2:
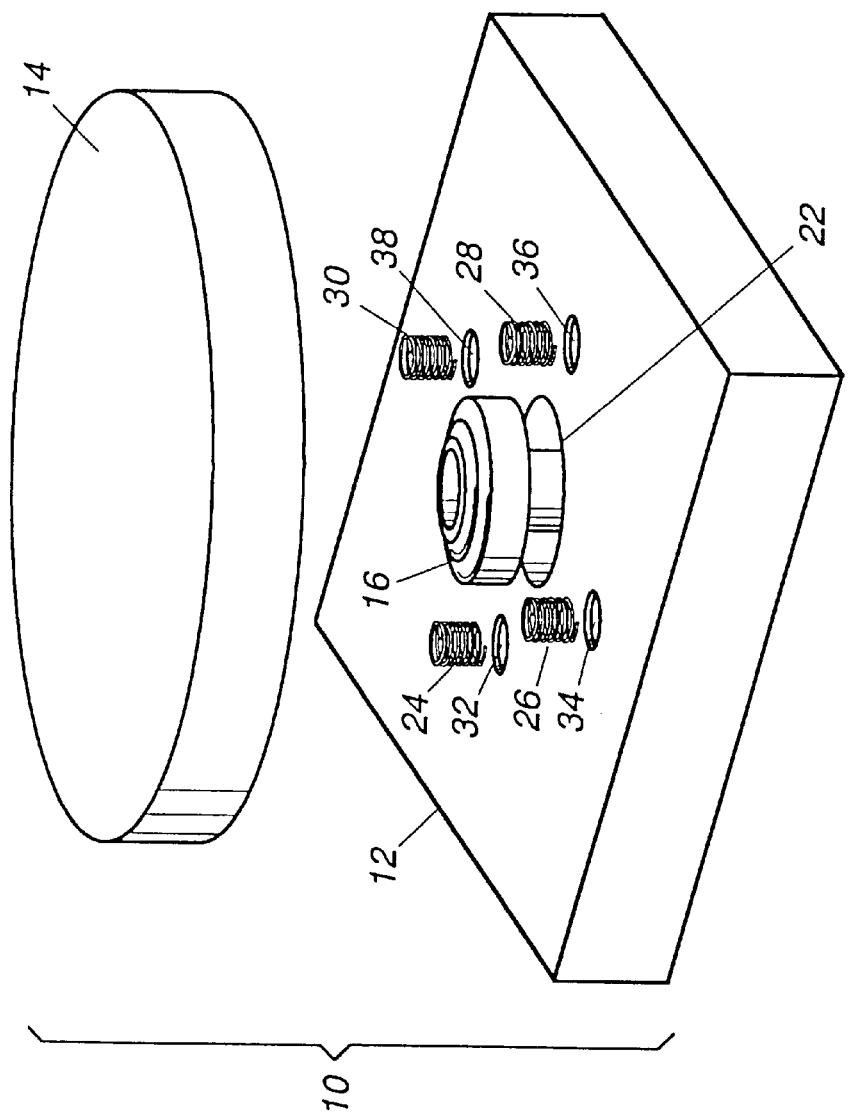
FIG. 2 is an exploded perspective view of a self-leveling fixture.
Figure 3:
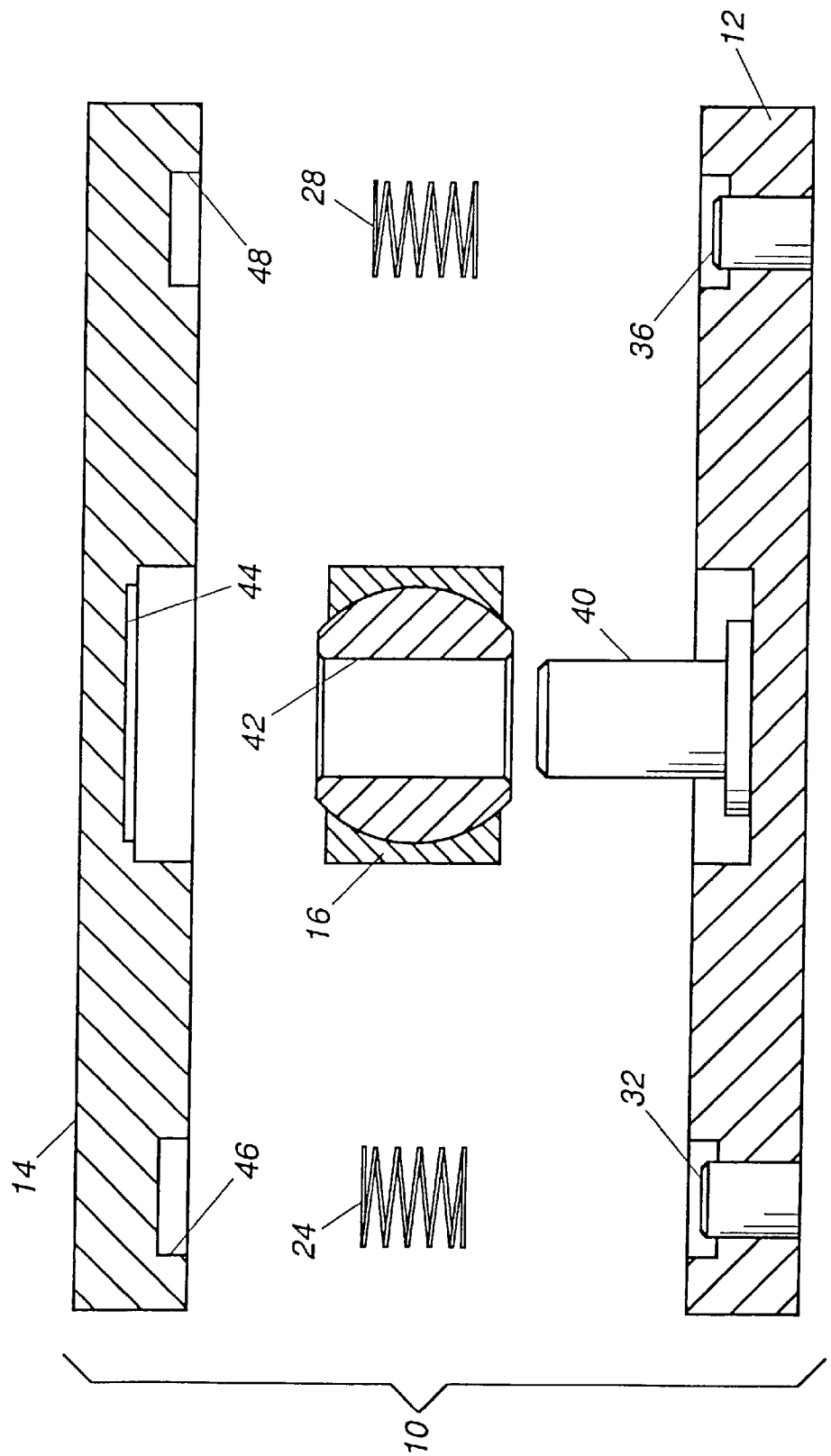
FIG. 3 is a cross-sectional exploded view of a self-leveling fixture for a manufacturing process, in accordance with the invention.

FIGS. 2 and 3 respectively illustrate therein an exploded perspective view and cross sectional exploded view of a self leveling fixture in accordance with the instant invention. The base member 12 and the operation stage 14 are separated from each other by the spherical plane bearing 16 disposed therebetween. As may be appreciated from a perusal of FIG. 2, the spherical plane bearing 16 is disposed near or at the central axis of the operation stage 14. As may further be appreciated from FIG. 2, the operation stage 14 is preferably in the shape of a circle or disc, with the spherical plane bearing disposed at the center thereof. Disposed about the peripheral area of the operation stage 14 are a plurality of spring members 24, 26, 28 and 30 positioned on pins 32, 34, 36, and 38 respectively. More particularly, the base member 12 includes a first central post 40 disposed in a central cavity 22 and adapted to accommodate spherical plane bearing 16. Spherical plane bearing 16 includes a via 42 formed therethrough which is sized and shaped so as to fit snugly over post 40 (FIG. 3). Thereafter, operation stage 14, which includes a cavity 44 sized and shaped so as to fit atop the spherical plane bearing 16, is disposed atop the spherical plane bearing 16.

The spring members, for example, 24 and 28 of FIG. 2, are positioned on post members 32 and 36, respectively in base member 12. The springs are then captured by cavities 46 and 48 formed in operation stage 14. The spherical plane bearing and spring members are each fabricated of materials well known to those of ordinary skill in the art.

In operation, the self-leveling fixture illustrated in FIGS. 1–3 illustrated hereinabove allow a 360° pivotal compliance in the z-axis of the operation stage as a dynamic self-leveling system for use in, for example, ultrasonic welding applications. Accordingly, any pressure placed on operation stage 14 result in its being properly parallel to the application of the pressure applied by the operation tool, such as an ultrasonic welding horn. Thus, when a conventional ultrasonic welding nest such as nest 20 is fixed to the operation stage 14, it has the ability to self adjust for minor abnormalities created within the assembly being welded, thereby compensating in a real time mode during the welding cycle. Once the welding process is completed, spring members 24–30 respectively assure that the operation stage returns to a predetermined normal position, ready to accept the next piece part for operation.

FIG. 4 shows the self-leveling fixture of the present invention placed on an ultrasonic welder. The base member 12 is placed atop the ultrasonic welder base 50. The nest 20 rests on top of the operation stage 14. Above the nest 20 is the horn 60, the booster 70, and the transducer 80. Spring members, two of which are shown (24 and 28), return the operation stage 14 to a predetermined normal position after displacement.

FIG. 5 is a closer view of the operation stage 14 of one embodiment of the self-leveling fixture. Placed atop the operation stage 14 is a slab 110, secured by flynuts 100. Placed atop the slab 110 is the nest 20 (which alternatively may be part of the slab), and in the nest rests a plastic part 90 to be welded.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An ultrasonic welder for manufacturing, the ultrasonic welder having a self-leveling fixture comprising:

a base member;

an operation stage having a central region and a peripheral area; and self-correcting leveling means operatively disposed between said base member and said operation stage, said leveling means comprising a spherical plane bearing disposed between said base member and the central region of said operation stage, and a plurality of spring members disposed between said base member and the peripheral area of said operation stage.

2. The ultrasonic welder of claim 1, further including an interchangeable nest mounted on said operation stage.

3. The ultrasonic welder of claim 1, wherein said spherical plane bearing is mounted on a post in said base member and fits into a cavity in said operation stage.

4. The ultrasonic welder of claim 1, wherein said operation stage is generally circular in shape, and said spring members are disposed around the peripheral area thereof.

5. The ultrasonic welder of claim 1, wherein said springs are mounted on pins set in said base member and fit into cavities in said operating stage.

6. A machine for applying pressure to a part situated thereon, the machine comprising:

means for applying pressure to a surface of the part; and a self-leveling fixture for holding the part, the self-leveling fixture comprising:

a base member;

an operation stage having a central region and a peripheral area and on which the part is situated; and self-correcting leveling means operatively disposed between said base member and said operation stage, said leveling means comprising a spherical plane bearing disposed between said base member and the central region of said operation stage, and a plurality of spring members disposed between said base member and the peripheral area of said operation stage, wherein said leveling means operates in response to pressure being applied to the part by the means for applying pressure.

7. The machine of claim 6, wherein the machine comprises an ultrasonic welder.

8. The machine of claim 7, wherein the means for applying pressure comprises an ultrasonic horn for contacting the surface of the part.

9. The machine of claim 6, further including an interchangeable nest mounted on said operation stage for holding the part.

10. The machine of claim 6, wherein said spherical plane bearing is mounted on a post in said base member and fits into a cavity in said operation stage.

11. The machine of claim 6, wherein said operation stage is generally circular in shape, and said spring members are disposed around the peripheral area thereof.

12. The machine of claim 6, wherein said springs are mounted on pins set in said base member and fit into cavities in said operating stage.

* * * * *